United States Patent Office 3,838,100
Patented Sept. 24, 1974

3,838,100
REACTION PRODUCTS OF PHENOL DERIVATIVES WITH PHOSPHOROUS COMPOUNDS AS STABILIZERS FOR POLYMERS
Heinz Eggensperger, Gadernheim uber Bensheim, Volker Franzen, Heidelberg, and Hans Stephen, Bensheim, Bergstrasse, Germany, assignors to Ciba-Geigy AG, Basel, Switzerland
No Drawing. Continuation of application Ser. No. 155,623, June 22, 1971, now Patent No. 3,784,650, which is a continuation-in-part of application Ser. No. 748,619, July 30, 1968, now Patent No. 3,655,833. This application Mar. 1, 1973, Ser. No. 336,966
Claims priority, application Germany, Aug. 12, 1967, P 16 43 880.5
Int. Cl. C08f 45/58
U.S. Cl. 260—45.95 C     13 Claims

ABSTRACT OF THE DISCLOSURE
Novel compounds having the formula

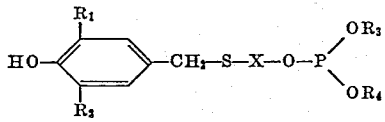

wherein $R_1$ is selected from the group consisting of hydrogen and alkyl radicals having 1 to 6 carbon atoms, $R_2$ is an alkyl radical having 1 to 6 carbon atoms, X is selected from the group consisting of alkylene radicals having 1 to 6 carbon atoms and carboxyl interrupted alkylene radicals having 1 to 6 carbon atoms, and $R_3$ and $R_4$ are selected from the group consisting of alkyl, aryl, alkaryl, arylalkyl, alkoxyalkyl, alkoxyaryl, aryloxyalkyl, chloroalkyl, chloroaryl, chloroalkaryl, chloroarylalkyl and

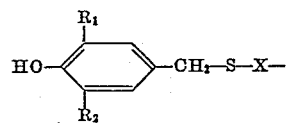

wherein $R_1$, and $R_2$ and X are as defined above and are useful as stabilizers for polymeric compositions.

---

This is a continuation of application Ser. No. 155,623, filed June 22, 1971, now Pat. No. 3,784,650 which is a continuation-in-part of application Ser. No. 748,619, filed July 30, 1968, now U.S. Pat. No. 3,655,833.

The decomposition of organic polymer compounds by heat and light usually in the presence of oxygen is known to result in a loss of desirable qualities. This decomposition has been retarded by the addition of stabilizers as for example of phenols, organic phosphites and trithiophosphites.

We have discovered that organic polymer compounds may be stabilized against decomposition by heat, oxygen and/or light obtained by the high temperature reaction product of a suitable phenol derivative with certain phosphorous compounds.

Suitable phenol derivatives are those having the formula:

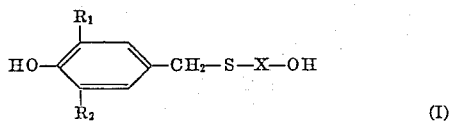

wherein $R_1$ is hydrogen or a straight chain or a branched chain alkyl group with 1 to 6 carbon atoms, $R_2$ is a straight chain or branched chain alkyl group with 1 to 6 carbon atoms and X is an alkylene chain with 1 to 6 carbon atoms which may be interrupted by a carboxyl group.

The phosphorous compounds useful for practicing the present invention are those having the formula:

wherein $Y_1$, $Y_2$ and $Y_3$ are selected from the group consisting of alkoxy, aryloxy, alkaryloxy, arylalkoxy, alkoxyalkoxy, alkoxyaryloxy, aryloxyalkoxy, chloroalkoxy, chloroaryloxy, chloroalkaryloxy, chloroarylalkoxy radicals having 1 to 30 carbons and chlorine. When $R_3$ and/or $R_4$ are alkyl, groups having 4 to 12 carbons are preferred. Phenyl and naphthyl are preferred as aryl groups, especially phenyl. When $R_3$ and/or $R_4$ contain an ether oxygen or chlorine, they are preferably bonded to an alkyl for having 2 to 6 carbons, especially ethyl or isopropyl groups. The alkyl and aryl radicals alone or in combination preferably contain no substitutions except chlorine and oxygen.

These new reaction products are only slightly volatile, have a superior stabilizing effect compared with known stabilizers, and can be used to stabilize a large number of different polymers. Some examples of organic polymers that are stabilized by the new compounds of the present invention are polyolefins, polydiolefins, polystyrene, copolymers of butadiene and styrene (BS polymers), terpolymers of acrylonitrile-butadiene-styrene (ABS polymers), terpolymers of methacrylic acid ester-butadiene-styrene (MBS polymers), as well as polymers and copolymers of vinyl chloride and organic esters, such as vinyl acetate and methyl methacrylate. The novel stabilizers are also useful to stabilize synthetic and natural oils and plasticizers such as dioctyl phthalate and the like.

The phenols used as starting compounds in formula I can be obtained without difficulty and in good yield from the corresponding hydroxybenzyl halides and mercaptides by the following reaction:

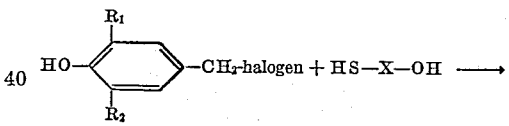

Compound (I) H halogen

Some examples of the phenol derivatives suitable as starting compounds of formula I are:

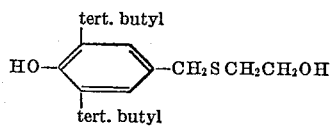

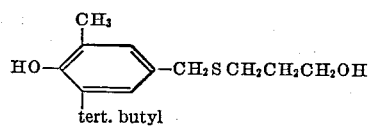

and

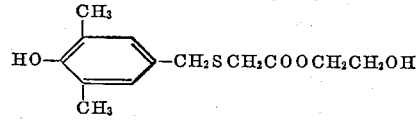

In the reaction of the phenols of formula I with the phosphorous compounds of formula II at elevated temperature, the two reaction partners combine to form products having the following formula:

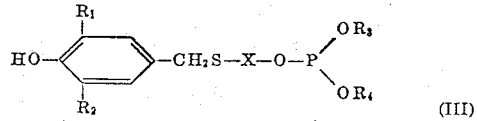

in which $R_1$, $R_2$, and X have the meaning given above and $R_3$ and/or $R_4$ are alkyl, aryl, arylalkyl, alkaryl, alkoxyalkyl, alkoxyaryl, aryloxyalkyl, chloroalkyl, chloroaryl, chloroalkaryl, chloroarylalkyl or have the formula:

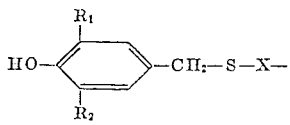

Combinations of formula III with more than one

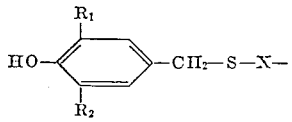

group in the molecule are obtained if the proportion of phenol derivative of formula I to the phosphorous compound is about 3:1 or about 2:1.

If one of the radicals $R_1$ or $R_2$ in the phenol derivative of formula I represents hydrogen, or, if $R_1$ and $R_2$ are methyl groups, some of the phenolic OH groups will react with the phosphorous compound forming a compound having the following formula:

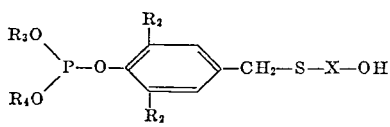

(IV)

These mixtures likewise produce excellent stabilizers.

The compounds of formulas III and IV have not yet been described in the literature, however, they are usually very viscous liquids which can be directly used as stabilizers.

The stabilizers of the present invention are generally used in amounts of 0.1 to 10% by weight of the polymer or oil being stabilized and they can be used in combination with known phenolic antioxidants or thioether compounds, for example the esters of thiodipropionic acid.

The simplest way of preparing the new compounds of the present invention is by heating the phenol derivatives of formula I with the phosphorous compounds of formula II in the desired mole ratio under a vacuum at temperatures in the range of about 120 to 180° C., whereby compounds containing hydroxyl groups are produced and are continuously removed from the reaction medium. The reaction residue is usually a viscous liquid and is the stabilizer of the invention. The reaction by-products can also be removed by distillation, when necessary or desired.

Some examples for the phosphorous compounds of formula II are: triphenyl phosphite, didecyl phenyl phosphite, diphenyl octyl phosphite, di(nonylphenyl)phenyl phosphite, diethyl chlorophosphite, butyldichlorophosphite and phosphorous trichloride. The other phosphites which are suitable include trimethyl-, triethyl-, tripropyl-, triisopropyl-, tributyl-, tri - sec.butyl-, tri - isobutyl-, trisec.amyl-, trihexyl-, tri-cyclohexyl-, trioctyl-, tri-sec.octyl-, tri-isooctyl-, trinonyl-, tridecyl-, tri-sec.decyl-, tridodecyl-, tritetradecyl-, trioctadecyl-, tris-β-chlor-ethyl-, tris-β-chlor-iso-propyl-, tris-(alpha-phenyl-β-chlor - ethyl)-, tris - (β-chlor-β'-butoxy-isopropyl)-, tris - (β - chlor - β' - dodecyloxy-isopropyl)-, tris-(β-chlor-β'-phenoxy-isopropyl)-, tris-(β-chlor-β'-tolyloxy-iso - propyl)-, tris - (β - chlor - β'-p-tert.butyl phenoxy-isopropyl-, tri-benzyl-, phenyl-dibenzyl-, tris-(β-phenyl-ethyl)-, tris-(β-tolyl - ethyl)-, tritolyl-, tris-(trimethylphenyl)-, diphenyl-tolyl-, phenyl - ditolyl-, tri - p.tert.butylphenyl-, phenyl - di-(p-tert.butylphenyl)-, tri-hexylphenyl-, tri-octyl - phenyl-, tri-(dioctylphenyl)-, tri - nonylphenyl-, diphenyl - nonyl-phenyl-, and tri-dodecylphenyl phosphite.

When the phosphorous compound is PCl₃, the reaction proceeds in an expected manner. After adding 3 moles of an acid binding agent, preferably triethylamine, to a solution of 3 moles of the phenol derivative corresponding to formula I in an inert organic solvent, preferably petroleum ether, 1 mole phosphorous trichloride is added dropwise with cooling (20-25° C.). After stirring for some time, triethylamine hydrochloride is removed by suction filtration and the product washed with ice water and sodium bicarbonate until neutral. The solvent is distilled off and the residue can be used directly as a stabilizer.

Some examples of compounds conforming to formula III, which can be prepared by above procedures are:

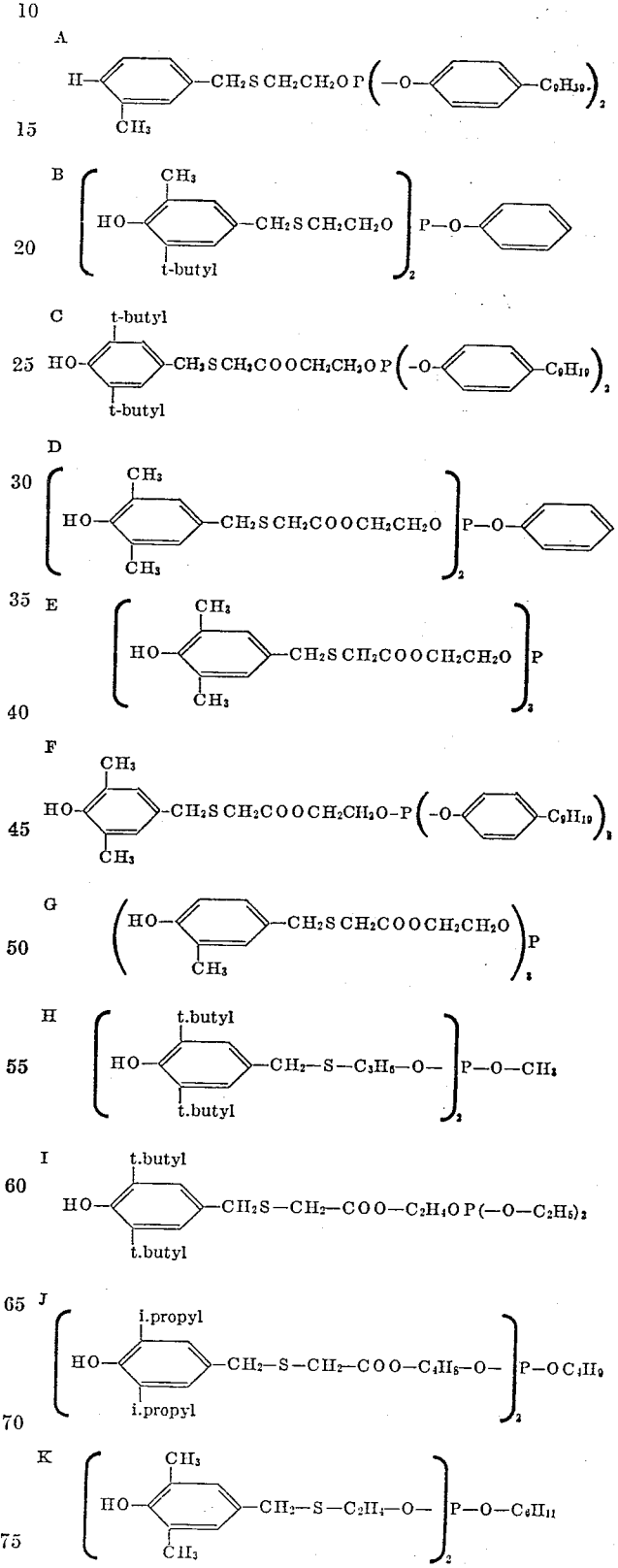

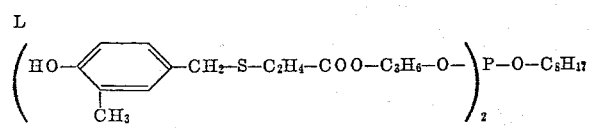
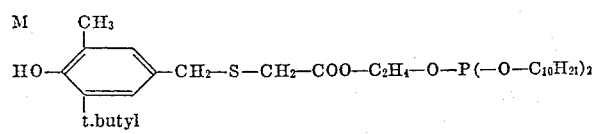
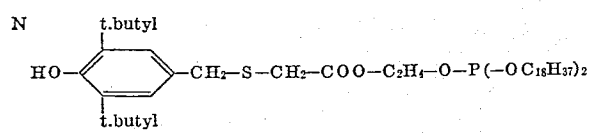
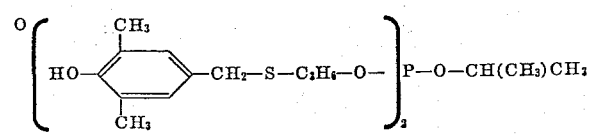
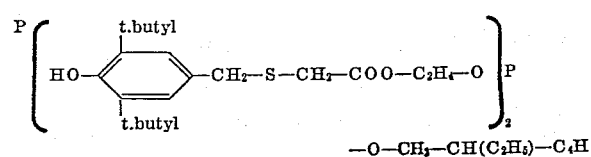
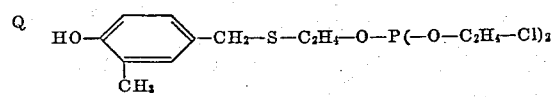
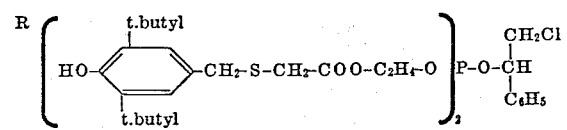
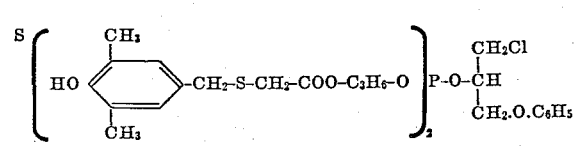
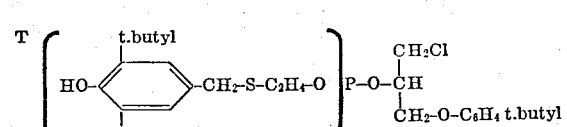
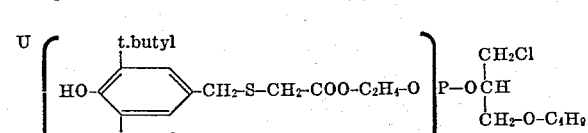
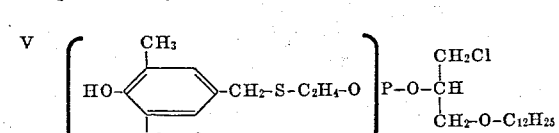
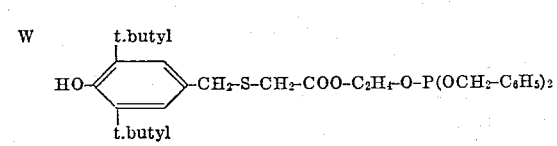
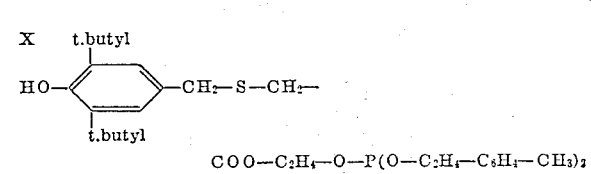

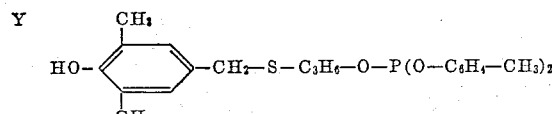
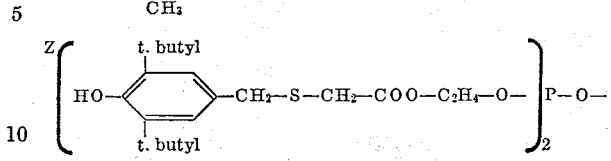
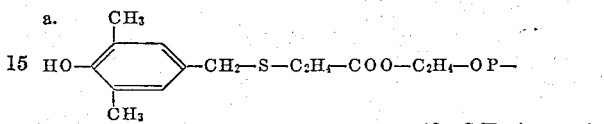
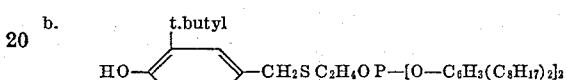
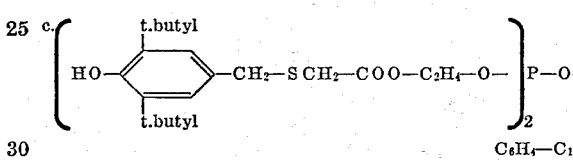

The invention will now be more fully illustraed by the following examples, but it is not limited thereto.

Example I

The reaction product of triphenylphosphite and 3,5-dimethyl-4-hydroxybenzyl mercapto)-acetic acid-2-hydroxyethyl ester.

568 g. (2.1 moles) of (3,5-dimethyl-4-hydroxybenzyl mercapto) acetic acid-2-hydroxyethyl ester and 217 g. (0.7 mole) of triphenylphosphite were heated under vacuum to 150° C. and the phenol released is distilled off dry under a pressure of 0.1 to 0.2 Torr. The residue is filtered and 573 g. (98% of the theoretical) of a very viscous liquid is obtained suitable for use directly as a stabilizer.

According to the IR spectrum there are, in addition to aliphatic P—O bonds, also 20% aromatic P—O bonds and free alcohol groups present, thus confirming that the compounds of formula E was obtained.

Example II

The reaction product of tris(nonylphenyl)-phosphite and 3,5-di-isopropyl-4-hydroxbenzyl-mercaptoacetic acid-beta-hydroxyethyl ester.

3.3 g. (10 mm.) of the above-described ester and 6.9 g. (10 mm.) tris-nonylphenylphosphite are heated under a high vacuum to 170–175° C. and the nonylphenyl released was distilled off.

The residue, a very viscous liquid ($n_D^{20}$:1.5327), can be used directly for stabilizing.

Example III

Polypropylene can be stabilized as follows:

The stabilizers or stabilizer mixtures indicated in Table II were each mixed with 100 parts polypropylene powder. All mixtures were rolled on a laboratory roller for 10 minutes at 100° C. into foils, which were then compressed on a press at 200 atmospheres and 200° C. to plates having 1 mm. thickness. Each plate was cut into 5 strips and subjected to accelerated aging in a drying cabinet at 140° C. and the time to the inception of brittleness of the samples was determined.

The stabilizing effect of the reaction products used according to the invention was compared with that of trithiophosphite (DT–AS 1,153,164) and the aromatic phosphites (DT–AS 1,229,296).

TABLE II

| Stabilizer (percent based on wt. pts. per 100 wt. pts. polypropylene) | Brittleness after days |
|---|---|
| 0.25% trithiophenylphosphite (DT-AS 1,153,164) | 2 |
| 0.25% trithiolauryl phosphite (DT-AS 1,229,296) | 10 |
| 0.25% reaction product of 1 mole of $PCl_3$ and 3 moles 3-tert.-butyl-4-oxyanisol with 4,4-thio-bis-(6-tert.-butyl-m-cresol) | 22 |
| 0.25% reaction product of 3 moles (4-hydroxy-2,6-dimethylbenzyl)-mercaptoacetic acid monoethylene glycol ester with 1 mole triphenyl phosphite | 35 |

Example IV

A mixture of 40 parts polyvinyl chloride of K-value 60, 40 parts of an ABS polymer, 20 parts dioctyl phthalate and 2 parts epoxidized soybean oil was stabilized and tested as follows:

Each of the stabilizers in Table III was mixed with 100 parts of the above composition, rolled for 5 minutes at 175° C. to 0.5 mm. thick foils, compressed and after division into several small plates, stored in air in a drying cabinet adjusted to 190° C. After intervals of 60, 75 and 90 minutes the plates were taken out of the heating cabinet and tested for decomposition by observing any decomposition.

TABLE III

| Stabilizer (percent based on wt. pts. per 100 wt. pts. resin) | Color of sample after— | | |
|---|---|---|---|
| | 60 min. | 75 min. | 90 min. |
| 2.0% commercial Ba/Cd stabilizer + 0.4% didecylphenyl phosphite. | Brown | Dark brown. | Brownish black. |
| 2.0% of the Ba/Cd stabilizer as above + 0.2% stabilizer C. | Yellow | Yellow | Light brown. |

Example V

MBS resins were stabilized as follows:

All of the mixtures listed in Table IV having 100 parts of a terpolymer of a methacrylate, butadiene and styrene and the stabilizer indicated were rolled on a laboratory roller for 10 minutes into foils, which were compressed on a plate press at 200 atmospheres and 190° C. From all foils of 1 mm. thickness, 5 strips were cut and subjected to accelerated aging in a circulating air drying cabinet at 90° C.

The stabilizing effect was judged by the color change and brittleness of the strips.

TABLE IV

| Mixture | Color after 20 days | Brittle after days |
|---|---|---|
| 100 parts MBS resin, 0.25 parts 2,6-di-tert.butyl-p-cresol, 0.25 parts trisnonylphenyl-phosphite. | Colorless | 28 |
| 100 parts MBS resin, 0.5 parts 4,4'-thio-bis-(6-tert. butyl-m-cresol). | Brown | 37 |
| 100 parts MBS resin, 0.5 parts stabilizer F | Colorless | 63 |

Example VI

Dioctylphthalate was stabilized as follows:

Mixtures of 3 g. were prepared from dioctylphthalate and the stabilizers indicated in Table V which were then heated to 192° C. in a closed vessel with oxygen. The time was observed for a pressure drop of 20 torr caused by the plasticizer absorbing oxygen. The oxygen absorption is a sign of incipient decomposition.

TABLE V

| Stabilizer (percent based on wt. pts. per 100 wt. pts. resin): | Time for pressure drop of 20 torr in hours |
|---|---|
| 0.5% 2,2-bis-(4-hydroxyphenyl propane (bisphenol A) | 5.75 |
| 0.2% stabilizer No. A | 7.25 |
| 0.2% stabilizer F | 8.50 |

Example VII

A synthetic polymer oil was stabilized as follows:

Mixtures of 3 g. were prepared from an oil of a copolymer of ethylene and polyisobutylene and the stabilizers indicated in Table VI. The oxygen absorption at 176° C. determined as described under Example VI is reported in Table VI.

Table VI

| Stabilizer (percent based on wt. pts. per 100 wt. pts. oil): | Pressure drop of 20 torr after hours |
|---|---|
| 0.1% 4,4-thio-bis(6-tert.butyl-m-cresol) 0.1% tris nonylphenylphosphite | 1.9 |
| 0.2% di-tert. butyl-p-cresol | 2.2 |
| 0.2% stabilizer D | 2.8 |

Example VIII

Using the procedure of Example III and stabilizers K, M, N, O, R, T and a, similar results were obtained.

What is claimed is:

1. A synthetic polymeric composition stabilized with from 0.1 to 10% by weight of said synthetic polymeric composition of a compound having the formula:

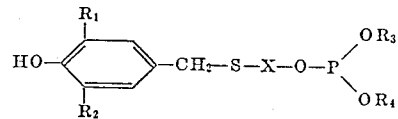

wherein $R_1$ is selected from the group consisting of hydrogen and alkyl radicals having 1 to 6 carbon atoms, $R_2$ is an alkyl radical having 1 to 6 carbon atoms, X is selected from the group consisting of alkylene radicals having 1 to 6 carbon atoms and carboxyl interrupted alkylene radicals having 1 to 6 carbon atoms, when $R_1$ or $R_2$ is other than tert. butyl, $R_3$ and $R_4$ are selected from the group consisting of alkyl, aryl, alkaryl, arylalkyl, alkoxyalkyl, aryloxyalkyl, chloroalkyl, and chloroaralkyl having 1 to 30 carbon atoms and

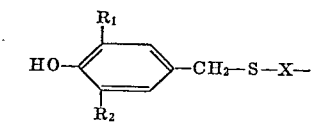

and, when $R_1$ and $R_2$ are tert. butyl $R_3$ is selected from the group consisting of alkyl, aryl, alkaryl, arylalkyl, alkoxyalkyl, aryloxyalkyl, chloroalkyl and chloroaralkyl, all having 1 to 30 carbon atoms and

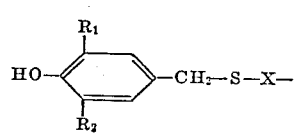

and $R_4$ is selected from the group consisting of alkyl, aryl, alkaryl, chloroalkyl, chloroaralkyl, alkoxyalkyl, and aryloxyalkyl, all having 1 to 30 carbon atoms wherein $R_1$, $R_2$ and X are as defined above.

2. A synthetic polymeric composition comprising a polymer selected from the group consisting of a polyolefin, a polydiolefin, polyvinyl chloride, polyvinyl acetate, polymethyl methacrylate, polystyrene, a vinyl chloride-vinyl acetate copolymer, a methacrylate-butadienestyrene terpolymer, and an acrylonitrile-butadienestyrene terpolymer and 0.1 to 10% by weight of the compound of claim 1 as a stabilizer.

3. The polymeric composition of claim 1 wherein the polymer is polypropylene and the stabilizer is

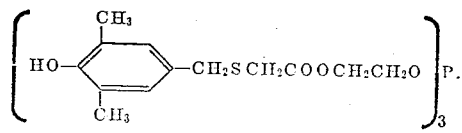

4. The polymeric composition of claim 1 wherein the polymer is polyvinyl chloride and the stabilizer is t-butyl

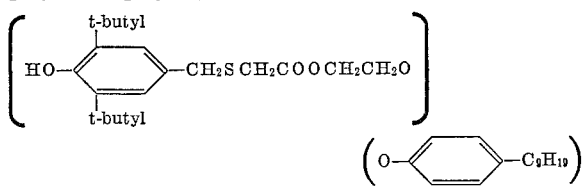

5. The polymeric composition of claim 1 wherein the polymer is a terpolymer of methacrylic acid, butadiene and styrene and the stabilizer is

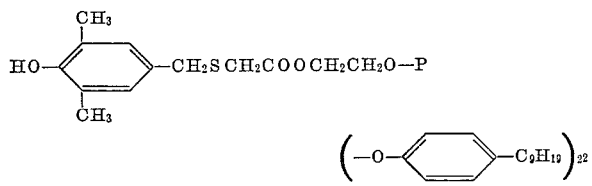

6. Synthetic polymeric composition of claim 1 wherein said compound has the formula:

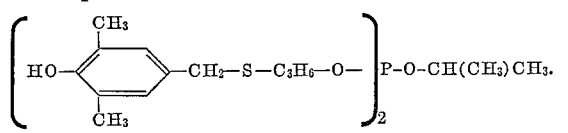

7. Synthetic polymeric composition of claim 1 wherein said compound has the formula:

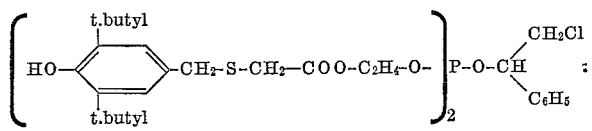

8. Synthetic polymeric composition of claim 1 wherein said compound has the formula:

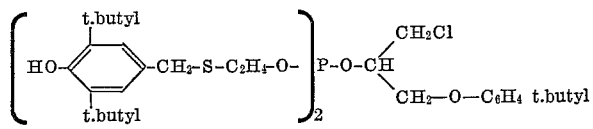

9. Synthetic polymeric composition of claim 1 wherein said compound has the formula:

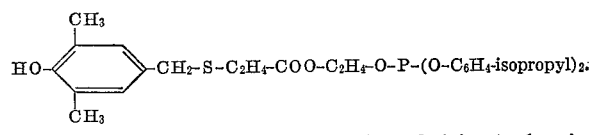

10. Synthetic polymeric composition of claim 1 wherein said compound has the formula:

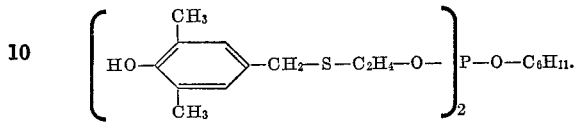

11. Synthetic polymeric composition of claim 1 wherein said compound has the formula:

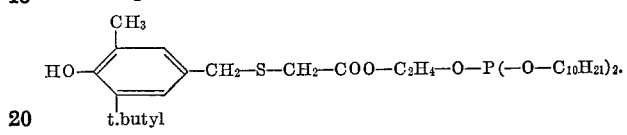

12. Synthetic polymeric composition of claim 1 wherein said compound has the formula:

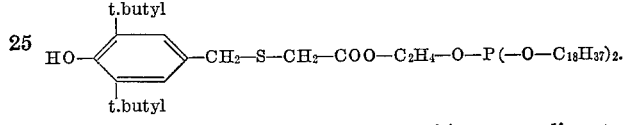

13. A synthetic polymeric composition according to claim 2 wherein the polymer is a polybutadiene-styrene copolymer.

References Cited
UNITED STATES PATENTS

| | | | |
|---|---|---|---|
| 3,408,324 | 10/1968 | Braus et al. | 260—45.95 D |
| 3,523,146 | 8/1970 | Braus et al. | 260—45.95 C |
| 3,539,528 | 11/1970 | Braus et al. | 260—45.85 B |
| 3,584,083 | 6/1971 | Braus et al. | 260—45.85 B |
| 3,655,833 | 4/1972 | Eggensperger et al. | 260—45.95 C |

MELVYN I. MARQUIS, Primary Examiner

U.S. Cl. X.R.

260—45.7 PS, 45.85 B, 457, 666.5